United States Patent
Wu et al.

(10) Patent No.: US 8,587,909 B2
(45) Date of Patent: Nov. 19, 2013

(54) TRANSIENT CURRENT SUPPRESSION DEVICE AND METHOD

(75) Inventors: Chia-Huang Wu, Taoyuan Hsien (TW); Chia-Yuan Chang, Taoyuan Hsien (TW); Wen-Ping Teng, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 213 days.

(21) Appl. No.: 13/046,330

(22) Filed: Mar. 11, 2011

(65) Prior Publication Data
US 2012/0092799 A1   Apr. 19, 2012

(30) Foreign Application Priority Data
Oct. 19, 2010 (TW) .............................. 99135504 A

(51) Int. Cl.
*H02H 9/04* (2006.01)
(52) U.S. Cl.
USPC ............................................................ 361/56
(58) Field of Classification Search
USPC ............................................................ 361/56
See application file for complete search history.

(56) References Cited

U.S. PATENT DOCUMENTS 3,683,365 A *  8/1972  Martin .......................... 345/467
6,246,153 B1 * 6/2001  Bishop et al. ................. 310/318

FOREIGN PATENT DOCUMENTS

WO    WO 2009/096414 A1 *  8/2009

OTHER PUBLICATIONS

Yamano, Hinamoto; machine translation of WO 2009096414; Aug. 2009.*

* cited by examiner

*Primary Examiner* — Jared Fureman
*Assistant Examiner* — Kevin J Comber
(74) *Attorney, Agent, or Firm* — Muncy, Geissler, Olds & Lowe, PLLC

(57) ABSTRACT

A transient current suppression device, which is applied to a fan, includes a filtering circuit, a delayed turn-on circuit and a forcibly electrical discharging circuit. The filtering circuit outputs a first voltage signal and a first current signal according to a first power signal. The delayed turn-on circuit is electrically connected with the filtering circuit. The delayed turn-on circuit provides a first discharging path for the first current signal according to a second power signal after a delayed time and outputs a second current signal. The forcibly electrical discharging circuit is electrically connected with the delayed turn-on circuit and the filtering circuit. The forcibly electrical discharging circuit provides a second discharging path for the second current signal according to the first voltage signal. Hence, the transient current suppression device can suppress the transient current effectively and rapidly.

10 Claims, 3 Drawing Sheets

TRANSIENT CURRENT SUPPRESSION DEVICE AND METHOD

CROSS REFERENCE TO RELATED APPLICATIONS

This Non-provisional application claims priority under 35 U.S.C. §119(a) on Patent Application No(s). 099135504 filed in Taiwan, Republic of China on Oct. 19, 2010, the entire contents of which are hereby incorporated by reference.

BACKGROUND OF THE INVENTION

1. Field of Invention

The present invention relates to a suppression device and, in particular, to a transient current suppression device.

2. Related Art

The transient interval is the required time period for a circuit system to transit from a transient state to a stable state. During the transient interval, the voltage or current of the circuit system is called a transient voltage or a transient current. When the DC power voltage is connected to a capacitor, the capacitor is in a short circuit at this instant. At this moment, the capacitor has no internal resistance or very small internal resistance, so that it is very possible to generate a larger transient current. If the transient current is conducted to a ground end and the ground end is connected the ground end of the power circuit, the system state of the power circuit can be easily affected. Moreover, the electronic components inside the power circuit may be damaged.

In order to reduce the effect of the transient current, a transient current suppression device is discloses. FIG. 1 is a schematic diagram showing a conventional transient current suppression device 1. As shown in FIG. 1, the transient current suppression device 1 includes a filtering circuit 11, a delayed turn-on circuit 12 and a control circuit 13. The filtering circuit 11 includes a capacitor C and a diode D, and the delayed turn-on circuit 12 includes a first resistor R1, a first capacitor C1, and a first transistor Q1.

During the circumstance of the first time of switching power or the load hot-plug, the filtering circuit 11 receives a first power signal V1, and the first power signal V1 flows through the diode D and then charges the capacitor C. Meanwhile, the capacitor C is in short circuit, and a first current signal I1 is generated. The delayed turn-on circuit 12 receives a second power signal V2 and then charges the first capacitor C1 after a delayed time. After the charging procedure, the first capacitor C1 is discharged to turn on the first transistor Q1, thereby forming a first discharging path. Thus, the first current signal I1 can be conducted to the ground end through the first discharging path.

The transient current suppression device 1 can prevent the transient current, which is generated due to the first time of switching power, from flowing back to the power circuit. However, if the second time of switching power is occurred in a short time period or several times of switching power are continuously performed, because the first capacitor C1 still contains electricity, the first transistor Q1 can be turned on at the moment that the second time of switching power is performed. Consequently, the first current signal I1 is immediately flowing to the ground end and then flowing to the power circuit, which provides the first power signal V1 and the second power signal V2.

FIG. 2 is a schematic diagram showing the current waveform of the first current signal I1 of FIG. 1. Herein, the stable current is about 200 mA, and the peak of the transient current is about 720 mA, which is three to four times of the stable current. Accordingly, if the transient current flows back to the power circuit, the state of the power circuit can be affected, and moreover, the internal electronic components thereof may be damaged, which may cause the malfunction of the power circuit. If the power circuit is a user system, the undesired malfunction may shut down the entire system, which will result in a huge lost.

Therefore, it is an important subject of the invention to provide a transient current suppression device that has a simple circuit design for decreasing the transient current and can be applied to hot-plug or frequent switching in short period.

SUMMARY OF THE INVENTION

In view of the above-mentioned subject, an objective of the present invention is to provide a transient current suppression device that can be applied to hot-plug or frequent switching in short period for rapidly suppressing the transient current.

To achieve the above objective, the present invention discloses a transient current suppression device, which is applied to a fan. The transient current suppression device includes a filtering circuit, a delayed turn-on circuit and a forcibly electrical discharging circuit. The delayed turn-on circuit is electrically connected with the filtering circuit, and the forcibly electrical discharging circuit is electrically connected with the delayed turn-on circuit and the filtering circuit. The filtering circuit outputs a first voltage signal and a first current signal according to a first power signal. The delayed turn-on circuit provides a first discharging path for the first current signal according to a second power signal after a delayed time and outputs a second current signal. The forcibly electrical discharging circuit provides a second discharging path for the second current signal according to the first voltage signal.

In one embodiment of the present invention, the delayed turn-on circuit includes a first capacitor, a first resistor, and a first transistor. One end of the first resistor and one end of the first capacitor are electrically connected with the gate of the first transistor.

In one embodiment of the present invention, the forcibly electrical discharging circuit includes a second capacitor and a second transistor, and one end of the second capacitor is electrically connected with the gate of the second transistor.

In one embodiment of the present invention, the forcibly electrical discharging circuit further includes a second resistor, and one end of the second resistor is electrically connected with the gate of the second transistor.

In addition, to achieve the above objective, the present invention also discloses a transient current suppression method, which is used in a transient current suppression device applied to a fan. The transient current suppression device includes a filtering circuit, a delayed turn-on circuit, and a forcibly electrical discharging circuit. The transient current suppression method includes the following steps. Firstly, the filtering circuit outputs a first voltage signal and a first current signal according to a first power signal. Secondly, the forcibly electrical discharging circuit provides a second discharging path for a second current signal according to the first voltage signal. Thirdly, the delayed turn-on circuit outputs the second current signal. Finally, the delayed turn-on circuit provides a first discharging path for the first current signal according to a second power signal after a delayed time.

In one embodiment of the present invention, the transient current suppression method, during the delayed time, further includes the following steps. The delayed turn-on circuit charges the first capacitor of the delayed turn-on circuit according to the second power signal. Then, the first capacitor is discharged to turn on the first transistor so as to provide the first discharging path for the first current signal.

In one embodiment of the present invention, the transient current suppression method further includes the step of turning on the second transistor by the forcibly electrical discharging circuit according to the first voltage signal so as to provide the second discharging path for the second current signal.

As mentioned above, the transient current suppression device of the invention has a forcibly electrical discharging circuit for providing a second discharging path. Thus, if the first capacitor is not completely discharged yet, the delayed turn-on circuit can output a second current signal according to the second power signal and the discharging current of the first capacitor, and the second current signal can flow to the ground end through the second discharging path. Accordingly, when a fan is in the circumstance of frequently switching, the transient current suppression device of the invention can rapidly suppress the transient current. Of course, the transient current suppression device of the invention can also be applied to hot-plug or frequent switching in short period.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 3:
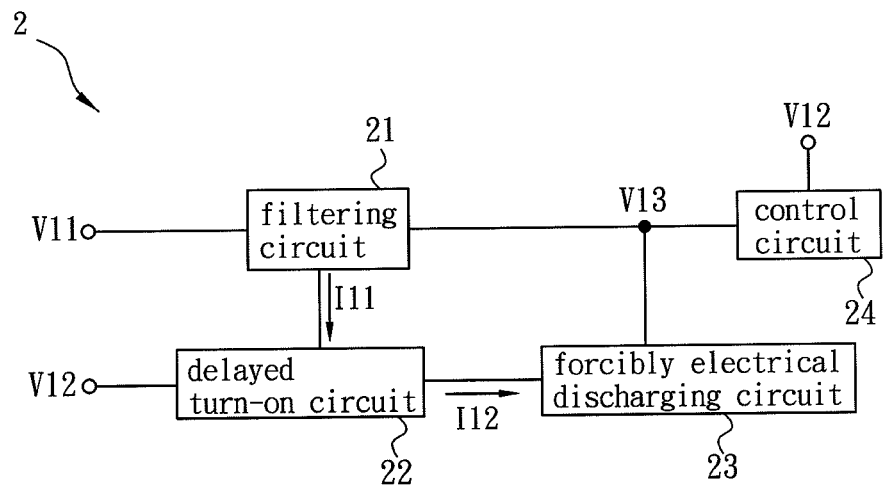
FIG. 3 is a schematic diagram showing a transient current suppression device of the invention.

FIG. 3 is a schematic diagram showing a transient current suppression device 2 according to an embodiment of the invention. Referring to FIG. 3, the transient current suppression device 2, which is applied to a fan, includes a power circuit (not shown), a filtering circuit 21, a delayed turn-on circuit 22, a forcibly electrical discharging circuit 23 and a control circuit 24.

The power circuit is electrically connected with the filtering circuit 21 and the delayed turn-on circuit 22, and is used for outputting a first power signal V11 and a second power signal V12 to the filtering circuit 21 and the delayed turn-on circuit 22, respectively. Herein, the first power signal V11 and the second power signal V12 can be applied by the same power circuit or by different power circuits. In addition, since the second power signal V12 is not the main power in this embodiment, the first power signal V11 is larger than the second power signal V12.

The filtering circuit 21 outputs a first voltage signal V13 and a first current signal I11 according to the first power signal V11.

The delayed turn-on circuit 22 is electrically connected with the filtering circuit 21. In this embodiment, the delayed turn-on circuit 22 provides a first discharging path for the first current signal I11 according to the second power signal V12 after a delayed time. In addition, the delayed turn-on circuit 22 also outputs a second current signal I12.

The forcibly electrical discharging circuit 23 is electrically connected with the delayed turn-on circuit 22 and the filtering circuit 21. In this embodiment, the forcibly electrical discharging circuit 23 provides a second discharging path for the second current signal I12 according to the first voltage signal V13.

The control circuit 24 is electrically connected with the filtering circuit 21 for receiving the first voltage signal V13 and the second power signal V12.

Figure 4:
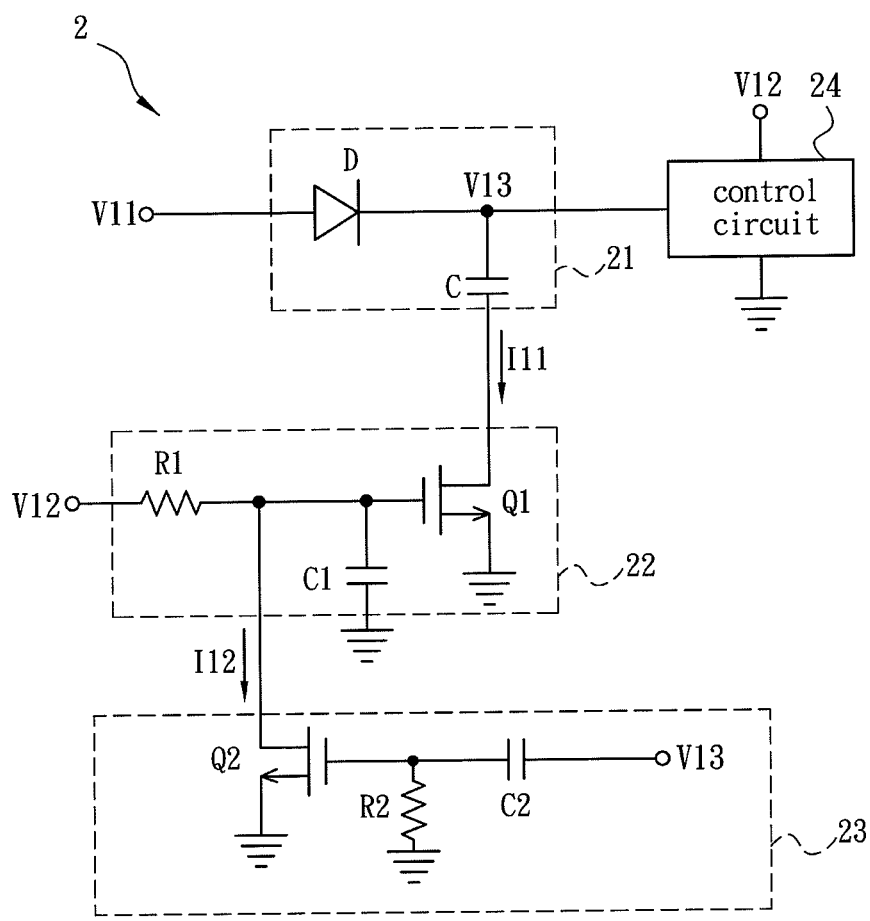
FIG. 4 is a circuit diagram of the transient current suppression device of the invention.

FIG. 4 is a circuit diagram of the transient current suppression device 2 of the invention. The structures and operations of the filtering circuit 21, delayed turn-on circuit 22 and the forcibly electrical discharging circuit 23 of the transient current suppression device 2 of the invention will be described hereinafter with reference to FIG. 4. To be noted, FIG. 4 is used for illustration only and is not to limit the scope of the invention.

The filtering circuit 21 has a capacitor C and a diode D. One end of the capacitor C and one end of the diode D are electrically connected to the control circuit 24 and the forcibly electrical discharging circuit 23, and the other end of the capacitor C is electrically connected to the delayed turn-on circuit 22. The filtering circuit 21 receives the first power signal V11, which is then filtered by the diode D so as to generate a first voltage signal V13. The first voltage signal V13 can charge the capacitor C. At this moment, the capacitor C is in short circuit and can generate a first current signal I11. In this embodiment, the first current signal I11 includes a transient current.

The delayed turn-on circuit 22 includes a first capacitor C1, a first resistor R1, and a first transistor Q1. One end of the first resistor R1 and one end of the first capacitor C1 are electrically connected with the gate of the first transistor Q1. The other end of the first resistor R1 receives the second power signal V12, and the other end of the first capacitor C1 and one end of the first transistor Q1 are connected with a ground end. The first transistor Q1 can be a P-type transistor or an N-type transistor. In this embodiment, the first transistor Q1 is an N-type transistor for example. The delayed turn-on circuit 22 receives the second power signal V12, which is rectified by the first resistor R1 and then charges the first capacitor C1. After the first capacitor C1 is fully charged, it can be discharged to turn on the first transistor Q1 so as to generate a first discharging path for the first circuit signal I11. Accordingly, the first current signal I11 can flow through the first discharging path.

The forcibly electrical discharging circuit 23 includes a second capacitor C2, a second resistor R2, and a second transistor Q2. One end of the second capacitor C2 and one end of the second resistor R2 are electrically connected with the gate of the second transistor Q2. The other end of the second capacitor C2 receives the first voltage signal V13, and the other end of the second resistor R2 and one end of the second transistor Q2 are connected with a ground end. The forcibly electrical discharging circuit 23 receives the first voltage signal V13, which is used to charge the second capacitor C2. After that, the second transistor Q2 can be then turned on to generate a second discharging path for the second circuit signal I12. Accordingly, the second current signal I12 can flow through the second discharging path. To be noted, it is also possible to not configure the second resistor R2, which can be determined by the circuit design.

In addition, the present invention also discloses a transient current suppression method, which is used in a transient current suppression device applied to a fan. The transient current suppression method includes the following steps. Firstly, the filtering circuit outputs a first voltage signal and a first current signal according to a first power signal. Secondly, the forcibly electrical discharging circuit provides a second discharging path according to the first voltage signal. Thirdly, the delayed turn-on circuit outputs a second current signal flowing through the second discharging path. Finally, the delayed turn-on circuit provides a first discharging path for the first current signal according to a second power signal after a delayed time. The transient current suppression method used in the transient current suppression device 2 of the invention will be described hereinafter with reference to FIG. 4.

During the first time of performing the power switching or the load hot plug, a power circuit can provide a first power signal V11 and a second power signal V12, which are separately applied to the filtering circuit 21 and the delayed turn-on circuit 22.

Then, the filtering circuit 21 receives the first power signal V11, which is then filtered by the diode D, so as to output a first voltage signal V13 to the forcibly electrical discharging circuit 23 and the control circuit 24. After that, the first voltage signal V13 can charge the capacitor C so as to output a first current signal I11.

Next, the forcibly electrical discharging circuit 23 can charge the second capacitor C2 according to the first voltage signal V13. At this moment, the second capacitor C2 is in short circuit, and the first voltage signal V13 can turn on the second transistor Q2 so as to form a second discharging path.

In addition, the first capacitor C1 of the delayed turn-on circuit 22 can be charged by the second power signal V12 after a delayed time. After the first capacitor C1 is fully charged, it can be then discharged to turn on the first transistor Q1 so as to form a first discharging path. Accordingly, the first current signal I11 can flow to the ground end through the first transistor Q1.

Thus, when the first capacitor C1 is charged by the second power signal V12, a part of the second power signal V12 can be converted into a second current signal I12, which flows to the ground end through the second discharging path. In other words, the current discharged by the first capacitor C1 can be converted into the second current signal I12, which flows to the ground end through the second discharging path.

Finally, after the capacitor C of the filtering circuit 21 is fully charged, it can become an open circuit and be discharged to the control circuit 24. In addition, after the second capacitor C2 is fully charged, it can then be discharged to the second resistor R2 and the second transistor Q2.

During the second time of performing the power switching or the load hot plug, or in the circumstance of switching power for several times, the power circuit also provide the first power signal V11 and the second power signal V12 to the filtering circuit 21 and the delayed turn-on circuit 22.

The filtering circuit 21 can output a first voltage signal V13 and a first current signal I11 according to the first power signal V11. Then, the second capacitor C2 of the forcibly electrical discharging circuit 23 is in transient short circuit, so that the second transistor Q2 thereof can be turned on so as to provide a second discharging path.

During a delayed time, the delayed turn-on circuit 22 can charge the first capacitor C1 according to the second power signal V12. Herein, a part of the second power signal V12 is converted into the second current signal I12, which flows to the ground end through the second discharging path. After the first capacitor C1 is fully charged, it is then discharged to turn on the first transistor Q1. However, a part of the discharged current may be converted into the second current signal I12 and then flow to the ground end through the second discharging path. In other words, the second current signals can flow to the ground end through the second transistor Q2.

If the time interval between the first and second times of power switching is shorter, and if the first capacitor C1 still stores some electricity, the transient current suppression device 2 of this embodiment can convert most of the inputted second power signal V12 into the second current signal I12, which flows to the ground end through the second discharging path. Consequently, at the instant of performing the second time of power switching, the embodiment can prevent from turning on the first transistor Q1 by the second power signal V12, which may allow the transient current of the first current signal I11 to immediately flow to the ground end.

In this embodiment, since the second power signal V12 is not the main power and is used to turn on the first transistor Q1 only, the current of the second current signal I12 outputted by the delayed turn-on current 22 is smaller than that of the first current signal I11, so that the effect to the power circuit, while the second current signal I12 flows to the ground end through the second discharging path and back to the ground end of the power circuit, can be sufficiently reduced.

Figure 1:
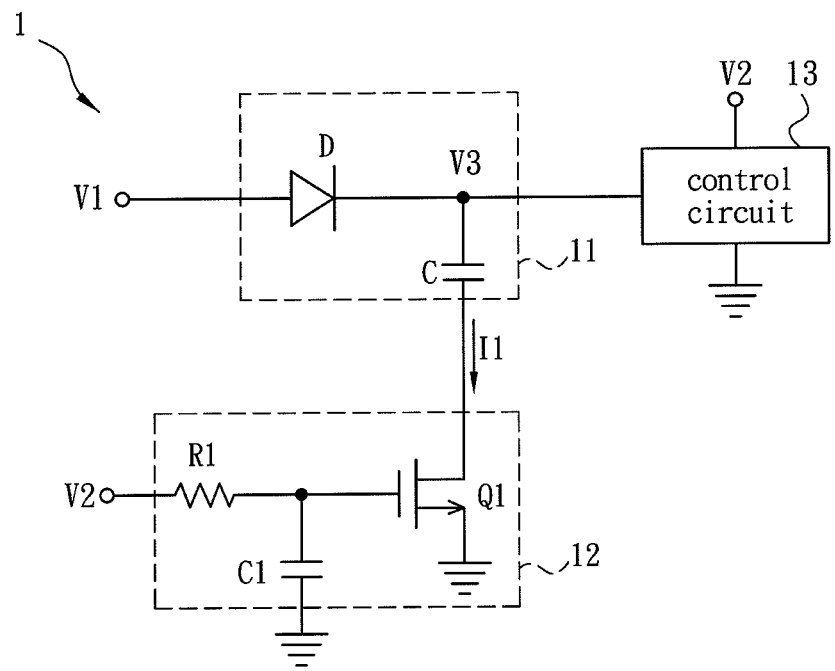
FIG. 1 is a schematic diagram showing a conventional transient current suppression device.
Figure 2:
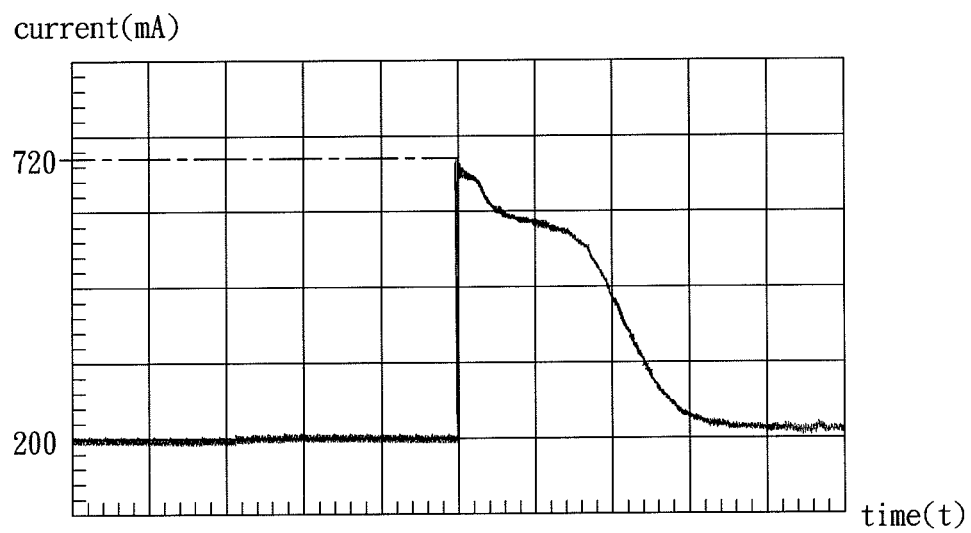
FIG. 2 is a schematic diagram showing the waveform of the conventional transient current.
Figure 5:
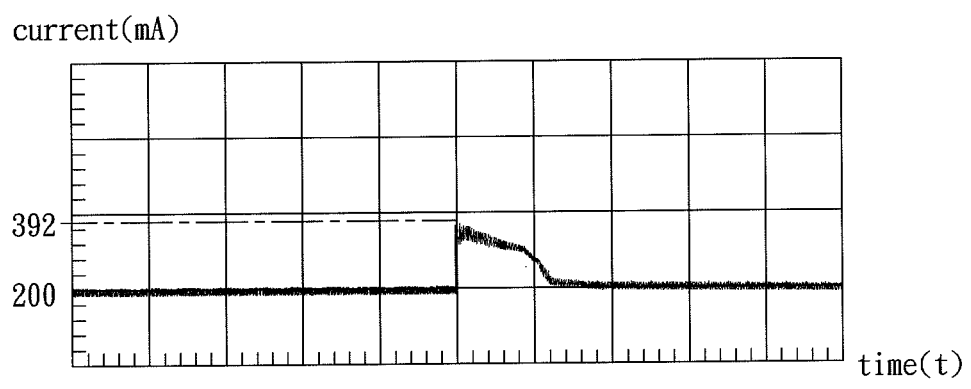
FIG. 5 is a schematic diagram showing the waveform of the transient current of the invention.

FIG. 5 is a schematic diagram showing the waveform of the transient current of the second current signal I11 shown in FIG. 4. Herein, the peak of the transient current of the second current signal I11 according to this embodiment is about 392 mA. Compared with the transient current shown in FIG. 2, the transient current suppression device of the invention can effectively suppress the transient current. As shown in FIGS. 2 and 5, the transient current suppression device of the invention can suppress approximate 50% of transient current without affecting the stable current.

In summary, the transient current suppression device of the invention has a forcibly electrical discharging circuit for providing a second discharging path. Thus, if the first capacitor is not completely discharged yet, the delayed turn-on circuit can output a second current signal according to the second power signal and the discharging current of the first capacitor, and the second current signal can flow to the ground end through the second discharging path. Accordingly, when a fan is in the circumstance of frequently switching, the transient current suppression device of the invention can rapidly suppress the transient current. Of course, the transient current suppression device of the invention can also be applied to hot-plug or frequent switching in short period.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:
1. A transient current suppression device, which is applied to a fan, comprising:
a filtering circuit outputting a first voltage signal and a first current signal according to a first power signal;
a delayed turn-on circuit electrically connected with the filtering circuit, wherein the delayed turn-on circuit provides a first discharging path for the first current signal according to a second power signal after a delayed time and outputs a second current signal; and a forcibly electrical discharging circuit electrically connected with the delayed turn-on circuit and the filtering circuit, wherein the forcibly electrical discharging circuit comprises a capacitor and a transistor, and one end of the capacitor is electrically connected with the gate of the transistor, and the other end of the capacitor is electrically connected with the filtering circuit, wherein the capacitor of the forcibly electrical discharging circuit is charged according to the first voltage signal outputted from the filtering circuit and the capacitor of the forcibly electrical discharging circuit is in short circuit, and the transistor of the forcibly electrical discharging circuit is turned on by the first voltage signal to form a second discharging path.

2. The transient current suppression device according to claim 1, further comprising:

a power circuit providing the first power signal and/or second power signal.

3. The transient current suppression device according to claim 1, wherein the filtering circuit comprises a capacitor having one end electrically connected with the delayed turn-on circuit and another end for outputting the first power signal.

4. The transient current suppression device according to claim 1, wherein the delayed turn-on circuit comprises a first capacitor, a first resistor, and a first transistor, and one end of the first resistor and one end of the first capacitor are electrically connected with the gate of the first transistor.

5. The transient current suppression device according to claim 4, wherein the first transistor is a P-type transistor or an N-type transistor.

6. The transient current suppression device according to claim 1, wherein the forcibly electrical discharging circuit further comprises a resistor, and one end of the resistor is electrically connected with the gate of the transistor of the forcibly electrical discharging circuit.

7. The transient current suppression device according to claim 1, further comprising:

a control circuit electrically connected with the filtering circuit for receiving the first voltage signal.

8. A transient current suppression method, which is used in a transient current suppression device applied to a fan, wherein the transient current suppression device comprises a filtering circuit, a delayed turn-on circuit, and a forcibly electrical discharging circuit, wherein the forcibly electrical discharging circuit comprises a capacitor and a transistor, and one end of the capacitor is electrically connected with the gate of the transistor, and the other end of the capacitor is electrically connected with the filtering circuit, the transient current suppression method comprising steps of:

outputting a first voltage signal and a first current signal according to a first power signal by the filtering circuit;

charging the capacitor of the forcibly electrical discharging circuit according to the first voltage signal outputted from the filtering circuit, wherein the capacitor of the forcibly electrical discharging circuit is in short circuit at this moment;

turning on the transistor of the forcibly electrical discharging circuit by the first voltage signal to form a second discharging path;

outputting a second current signal, which passes through the second discharging path, by the delayed turn-on circuit; and providing a first discharging path for the first current signal by the delayed turn-on circuit according to a second power signal after a delayed time.

9. The transient current suppression method according to claim 8, wherein the delayed turn-on circuit comprises a first capacitor, a first resistor, and a first transistor, and one end of the first resistor and one end of the first capacitor are electrically connected with the first transistor.

10. The transient current suppression method according to claim 9, during the delayed time, further comprising steps of:

charging the first capacitor of the delayed turn-on circuit according to the second power signal; and discharging the first capacitor to turn on the first transistor so as to provide the first discharging path for the first current signal.

* * * * *